United States Patent
Butler

(10) Patent No.: US 9,268,936 B2
(45) Date of Patent: Feb. 23, 2016

(54) PHYSICAL MEMORY FORENSICS SYSTEM AND METHOD

(75) Inventor: James Butler, Washington, DC (US)

(73) Assignee: MANDIANT, LLC, Milpitas, CA (US)

(*) Notice: Subject to any disclaimer, the term of this patent is extended or adjusted under 35 U.S.C. 154(b) by 205 days.

(21) Appl. No.: 13/560,415

(22) Filed: Jul. 27, 2012

(65) Prior Publication Data
US 2014/0032875 A1     Jan. 30, 2014

(51) Int. Cl.
*G06F 12/10* (2006.01)
*G06F 21/55* (2013.01)
*G06F 21/64* (2013.01)

(52) U.S. Cl.
CPC .............. *G06F 21/554* (2013.01); *G06F 21/64* (2013.01); *G06F 12/10* (2013.01)

(58) Field of Classification Search
CPC . G06F 12/10; G06F 11/3636; G06F 12/1027; G06F 12/0802; G06F 12/1036; G06F 2212/681; G06F 12/1483; G06F 21/575; G06F 2212/7201; G06F 12/1475; G06F 17/2247; G06F 17/227; G06F 17/30097; G06F 17/30327; G06F 17/30914; G06F 12/00; G06F 12/1009; G06F 21/554; G06F 21/64; G06F 21/6218; G06F 21/78
See application file for complete search history.

(56) References Cited

U.S. PATENT DOCUMENTS

| | | | |
|---|---|---|---|
| 6,738,875 B1 | 5/2004 | Wang et al. | |
| 7,596,654 B1* | 9/2009 | Wong | 711/6 |
| 2004/0123136 A1* | 6/2004 | Jung | 713/200 |
| 2004/0199742 A1* | 10/2004 | Wang | 711/170 |
| 2007/0060394 A1* | 3/2007 | Gowin et al. | 463/47 |
| 2008/0235793 A1* | 9/2008 | Schunter et al. | 726/22 |
| 2012/0079596 A1* | 3/2012 | Thomas et al. | 726/24 |
| 2012/0278347 A1* | 11/2012 | Foster | 707/758 |

FOREIGN PATENT DOCUMENTS

KR    10-2012-0072119 A    7/2012

OTHER PUBLICATIONS

"A survey of main memory acquisition and analysis techniques for windows operating system", Stefan Vomel et al., Jun. 2011, Digital Invetigation, pp. 3-22.*
"The VAD tree: A process-eye view of physical memory", Brendan Dolan-Gavitt, 2007, Digital Invetigation, pp. S62-S64.*
International Search Report from published International Patent Application No. WO2014/018458, dated Nov. 26, 2013, one page.
Butler, J., et al., "Physical memory forensics for files and cache," Black Hat USA, 2011, Briefings, pp. 1-26, Aug. 3-4, 2011; https://www.blackhat.com/html/bh-us-11/bh-us-11-archives.html#Butler, pp. 9-12.

* cited by examiner

*Primary Examiner* — Hashem Farrokh
(74) *Attorney, Agent, or Firm* — Polsinelli PC; Adam C. Rehm

(57) ABSTRACT

The method of the present inventive concept is configured to utilize Operating System data structures related to memory-mapped binaries to reconstruct processes. These structures provide a system configured to facilitate the acquisition of data that traditional memory analysis tools fail to identify, including by providing a system configured to traverse a virtual address descriptor, determine a pointer to a control area, traverse a PPTE array, copy binary data identified in the PPTE array, generate markers to determine whether the binary data is compromised, and utilize the binary data to reconstruct a process.

18 Claims, 3 Drawing Sheets

PHYSICAL MEMORY FORENSICS SYSTEM AND METHOD

BACKGROUND

1. Field

The present inventive concept generally relates to information security incident response and forensic investigations. The present inventive concept more particularly concerns a physical memory analysis system and method configured to reconstruct processes and memory to a higher level of completion and confidence.

2. Discussion of Related Art

Information security investigators commonly analyze the physical memory contents of computer systems in order to identify potential problems or compromises. Compromises may include unauthorized access, modification, and/or utilization of the contents of physical memory.

The Central Processing Unit (CPU) is the computer hardware that provides the master control of other computer hardware. The CPU executes instructions for manipulating the contents of memory; these CPU instructions comprise computer binary code.

Physical Memory is hardware memory that provides the CPU with its primary fast-access bulk data store. Disk files are hardware-based memory stored in persistent storage that provides the OS with slow-access bulk data stores. A binary is executable CPU code. The Operating System (OS) is a binary computer program that provides high-level services and functionality related to the overall management of computer hardware, other binaries, and data.

A process is a structured virtual container for executable code and its data. Processes contain unique code that typically references shared OS binaries that provide common functionality, data, and services required by many computer programs. Shared binaries are commonly targeted by malicious actors.

A page is a fixed-sized block of contiguous physical memory. Among other states, a page may be free (containing no valid code or data), reserved for future use, or committed (containing code or data in use). A page may be stored in physical memory, stored in a disk, i.e., pagefile, or sourced from a binary disk file, i.e., mapped.

Pages may be swapped between physical memory and a data storage pagefile. This is accomplished by writing the data in that physical memory page to a pagefile, then loading new data into that page of physical memory, overwriting its original contents.

A page may be mapped between physical memory and a binary file. In this case, a swap does not require saving the current physical memory page data: when that page data is again required, it can be loaded from the existing disk file.

A cache is a structured virtual container for disk-mapped binaries or data. A cache provides high-speed access to the parts of disk files that are in frequent use. The OS continuously flushes the least-used memory blocks in the cache, replacing them with blocks needed more frequently. The most-used memory blocks in a cache tend to comprise the OS and its most-active Processes.

Virtual memory is an abstraction that allows pages of non-contiguous physical memory to be presented as contiguous memory by translation of virtual addresses to physical addresses.

The OS is responsible for determining which Process(es) is active at a particular time. The OS processes requests from the active Process to free, reserve, or commit pages. On a typical computer system, disk file memory is orders of magnitude larger than physical memory, and maximum (virtual) memory is orders of magnitude larger than the physical memory.

The OS memory manager maintains page table entry (PTE) data structures associating virtual address entries with entries providing the address of a fixed block of physical memory and status information regarding the page state. The PTE is shared with the CPU to provide the appearance of seamless contiguous memory to Processes.

The OS also maintains virtual address descriptors (VAD) data structure associating pages with their storage location, status, and process ownership.

Finally, but not inclusively, the OS also maintains various caches providing buffering between (slow) data storage devices and (fast) physical memory.

Thus, the OS can determine whether a particular page is required to be in physical memory and whether it is currently in physical memory. If the page is missing and is required, the OS can identify its location and retrieve the data.

Traditional techniques for obtaining physical memory data, for example to reconstruct Processes, are subject to several problems created by this complex system of physical memory address abstraction. These problems can be categorized as missing data and misattributed data.

One cause of missing data is pages associated with binaries that are not currently needed or being used by the process. These pages may be "freed" at any time, rendering invalid any page references to the unused portions of the binary. The process of marking pages not currently needed by a process is referred to as trimming the process' working set. Naïve or traditional translation of a process' virtual addresses treats invalid pages as missing data, on the assumption that the data cannot be acquired from a live memory acquisition.

One cause of misattributed data is ascribable to brute force translation of the process' entire virtual memory address range or misrepresentation of the OS caching structures. In the case of brute force translation of the entire address space of the process, the process' page tables and corresponding page table entries are inspected to determine if a virtual address correctly translates to a physical page. In other words, the address appears valid in the process context. However, the virtual address range that represents the OS I/O cache is a region in kernel memory that correctly maps to many if not all processes. A particular process, however, may not be associated with that page of the cached data and, therefore, it is misattributed in a brute force attempt to analyze or acquire all of the physical pages associated with a process.

Missing data and misattributed data stymie the effort to fully and accurately reconstruct files and processes from physical memory, thereby reducing the efficacy of investigators as well as potentially compromising their results. There is, therefore, a need in the industry for accurate reconstruction of files and processes from physical memory.

SUMMARY

The present inventive concept remedies the aforementioned problems by providing a method and system configured to permit accurate reconstruction of files and/or processes using physical memory.

Traditionally, the techniques used to analyze physical memory walk, parse, or traverse the OS memory manager data structures that perform the simple translation of a processes' virtual address memory range to pages physical memory. When a virtual address does not readily translate to a physical memory page, it is presumed invalid.

The method of the present inventive concept is configured to utilize Operating System data structures related to memory-mapped binaries. These structures provide a system configured to facilitate the acquisition of data that traditional memory analysis tools fail to identify.

The aforementioned may be achieved in an aspect of the present inventive concept by providing a method to determine whether a computer system has been compromised. The method includes the steps of traversing a virtual address descriptor to acquire complete process data and/or reconstructing mapped binary data based on the acquired complete process data.

The traversing the virtual address descriptor may include (i) traversing at least one descendant lineage to a terminal node using at least one pointer and at least one node, and/or (ii) retrieving data associated with the at least one node. The pointer may be a SECTION_OBJECT_POINTER structure having (i) a first pointer named ImageSectionObject, (ii) a second pointer named DataSectionObject, and/or (iii) a third pointer named SharedCacheMap, as described in further detail herein.

The method may further include the step of generating at least one marker based on the binary data. The marker may comprise one or more hashes. The method may further include the step of comparing at least one marker to another marker to determine whether a compromise exists within the system. The another marker may be based on binary data of known uncompromised data. The another marker may be a set of hashes.

The method may further include the step of determining whether the binary data is compromised based on the comparison. The method may further include the steps of executing a hashing process to produce a plurality of hash values based on the binary data, comparing the plurality of hash values with a set of control values and producing a result, and/or determining whether the binary data is compromised based on the result. The step of traversing the virtual address descriptor is executed when a virtual address causes a page fault.

The aforementioned may be achieved in another aspect of the present inventive concept by providing a method of reconstructing a process. The method may include the steps of traversing a virtual address descriptor to acquire complete process data, and/or reconstructing mapped binary data based on the acquired complete process data. The traversing the virtual address descriptor step may include the steps of (i) traversing at least one descendant lineage to a terminal node using at least one pointer and at least one node, and/or (ii) retrieving data associated with the at least one node.

Additional aspects, advantages, and utilities of the present inventive concept will be set forth in part in the description which follows and, in part, will be obvious from the description, or may be learned by practice of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

The present inventive concept is described in detail below with reference to the attached drawing figures, wherein.

Figure 1:
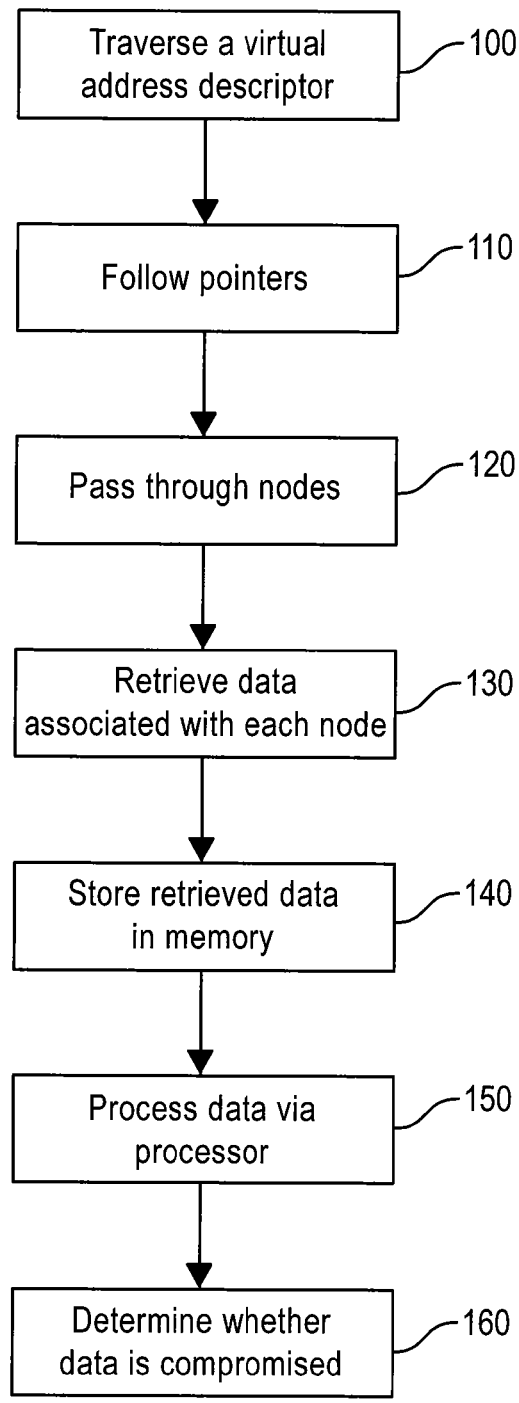
FIG. 1 is a flowchart illustrating an exemplary process of the present inventive concept.

The drawing figures do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein. Likewise, references to "exemplary" is used exclusively herein to mean "serving as an example, instance, or illustration." Any embodiment described herein as "exemplary" is not necessarily to be construed as preferred or advantageous over other embodiments.

The present inventive concept utilizes Operating System data structures related to memory-mapped binaries. These structures provide a system configured to facilitate the acquisition of data that traditional memory analysis tools fail to identify.

In this method, the system of the present inventive concept is configured to walk, parse/, or traverse a virtual address descriptor (VAD). The VAD is implemented as a tree-data structure and includes a pointer and a node, among other objects. The pointer may be a data unit with a value corresponding to a memory address. The node in the tree comprises the pointer to the node parent, pointers to its child nodes, e.g., typically left and right, and a block of structured data.

To walk the VAD tree, its descendent lineages can be traversed by the system to their terminal nodes in step 100, as illustrated in FIG. 1. During the traversing process in an embodiment of the present invention, pointers are followed in step 110 and each node is passed through in step 120 with data from each node being retrieved in step 130. Upon completion of the traversing process, every node is passed through. The data associated with and retrieved by the system from each node is stored in a memory of the system in step 140 and processed by a processor of the system in step 150.

The data retrieved by the system for each node in the VAD tree may include a virtual memory address and the size of its associated memory block, the process to which that block is assigned, its status, and the like.

On occasion, the address range represented by the VAD will translate to a page of physical memory that is not currently being used by the process. That page of the physical memory may have been swapper or mapped to disk or it may still be present in physical memory, but no longer part of the process' working set. Attempts by the process to access this memory can cause a page fault condition indicating that data that was in physical memory for the process is no longer valid. Conventional live memory acquisition tools do not attempt to acquire invalid data.

Nodes in the VAD tree may include, among other data, a CONTROL_AREA, which points to a File Object data structure. There may be two Control Areas with the VAD containing one of the Control Areas if the VAD represents a memory-mapped file. The Control Area from the VAD may point to a File Object, which has a reference to three section object pointers, of which two may be pointers to Control Areas, as discussed hereafter. The File Object is used by the system of the present inventive concept to acquire mapped pages, for example when a page fault occurs. In the exemplary embodiment of the present inventive concept, the execution of the acquisition of mapped pages occurs automatically when triggered by the page fault. It is foreseen, however, that the execution of the acquisition of mapped pages may be triggered by another event without deviating from the scope of the present inventive concept.

Mapped pages may be present within the memory of a computer for various reasons. For example, the OS provides common binary components used by most processes. When a specific process no longer requires that functionality, it might free pages associated with that component. Other processes, however, might still require that functionality. While a process might free the pages, the OS might retain them, e.g., as in-use by other processes.

Figure 2:
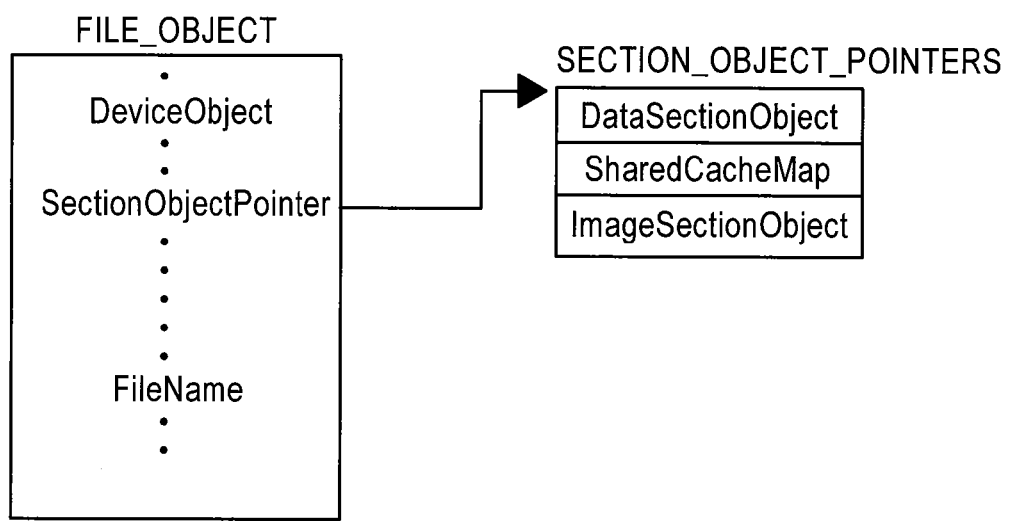
FIG. 2 is a diagram illustrating a File Object with a pointer data structure.

Turning to FIG. 2, the data in a File Object includes pointers to the name of the device on which the mapped file resides, the name of the file itself, various flags, and the SECTION_OBJECT_POINTERS data structure.

Figure 3:
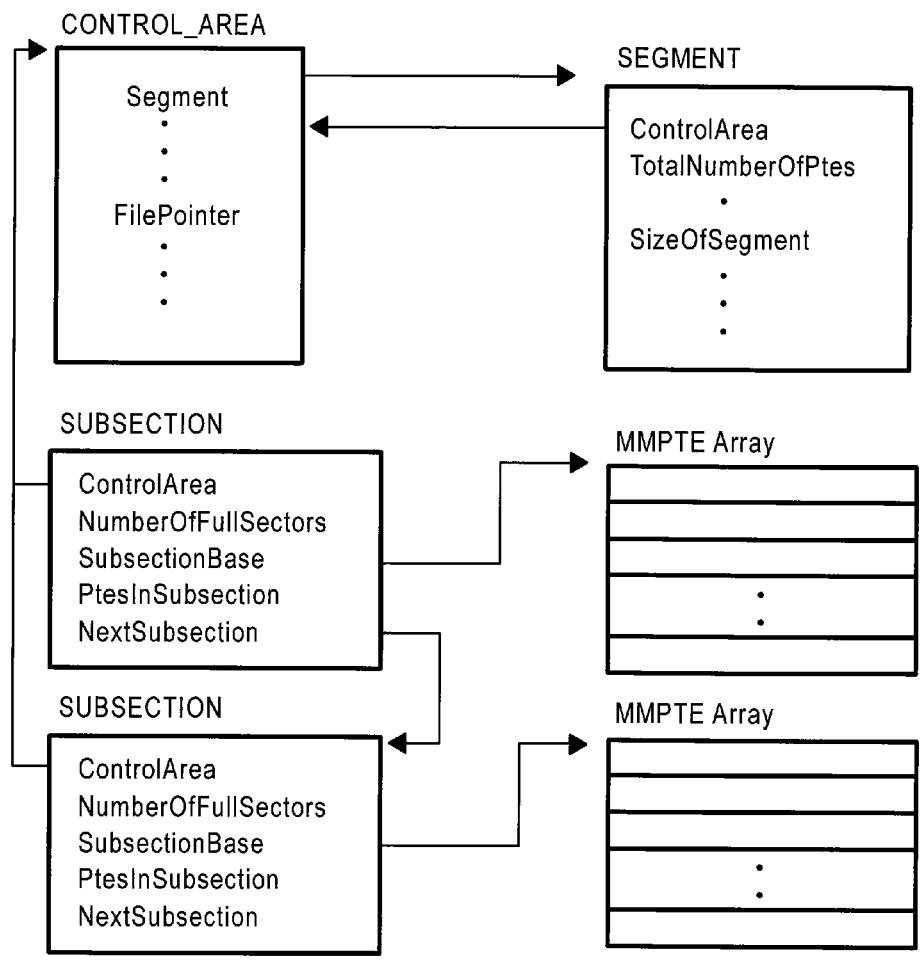
FIG. 3 is a diagram illustrating a path from a Control Area to Physical Memory.

Within the SECTION_OBJECT_POINTERS structure are three pointers named ImageSectionObject, DataSectionObject, and SharedCacheMap. ImageSectionObjects and DataSectionObjects are related and are themselves pointers to CONTROL_AREAs. ImageSectionObjects represent binaries or images. DataSectionObjects can point to structures used to maintain data files. The ImageSectionObject contain a pointer to a SEGMENT data structure, and immediately following the ImageSectionObject, which is a CONTROL_AREA, is a data structure known as the first SUBSECTION related to a region of the file, as illustrated in FIG. 3.

The SEGMENT data structure contains a pointer back to its ImageSectionObject, the size of the SEGMENT, and the total number of Prototype Page Table Entries (PPTEs). A PPTE contains the physical location and state of the page, whereas a regular PTE contains the location and state of the page relative to a given process. A regular PTE is the process' view of that page. The SUBSECTION structures represent pieces of the file. Each contains a pointer back to its ImageSectionObject, a pointer to the next SUBSECTION, and pointers to page table entries. Each PPTE contains a pointer to a physical memory page. If a simple translation of a PTE virtual address to a physical memory address resulted in a page fault condition for the process being analyzed, the system may still successfully translate the virtual address using the PPTE.

In this manner, parsing/traversing the SUBSECTION structure via the system results in identification of all pages associated with a mapped binary that resides in physical memory. For each PPTE that translates to a physical memory address, live data acquisition can be performed.

If a SEGMENT pointed to by a particular CONTROL_AREA does not have a pointer back to that CONTROL_AREA, the SEGMENT can be assumed corrupted and processing the related ImageSectionObject or DataSectionObject pointer should stop. In the SEGMENT, referenced by a CONTROL_AREA that represents an ImageSectionObject, the TotalNumberofPtes listed multiplied by the page size (0×1000) should be equal to the SEGMENT size indicated. Otherwise, the SEGMENT should be assumed to be corrupted and processing the related ImageSectionObject should stop.

DataSectionObjects are similar to ImageSectionObjects and may be utilized largely in the same way as ImageSectionObjects. ImageSectionObjects are used when trying to analyze or acquire the physical memory associated with a binary file, which are memory-mapped. DataSectionObjects are used to analyze or acquire memory-mapped data files such as those made available via the system sold under the trademark MICROSOFT WORD®.

In cases where the process' PTE is invalid, the pagefile is not indicated, and the data is not mapped and therefore not represented by an ImageSectionObject or DataSectionObject, the page may still be made available in a memory cache.

The SharedCacheMap is a pointer to the SHARED_CACHE_MAP structure, which is used by the operating system to maintain a cache. This structure mainly comprises pointers to Virtual Address Control Blocks (VACBs) or VACB Arrays (lists of VACBs), and stores information relating to the file size and length of valid data in the cache. If the valid data length is determined to be greater than the file size, the SHARED_CACHE_MAP structure is invalid.

SHARED_CACHE_MAP structures that are valid may be walked using the VACBs. Each VACB contains a pointer to a block of cache memory. Walking the VACB structure results in identification of all pages associated with the file in cache.

In cases where the data is no longer in cache, the file can only be recovered from disk.

Thus, process data corresponding to mapped binaries and mapped data, e.g., data and/or files associated with one or more systems such as those sold under the trademark MICROSOFT OFFICE®, data associated with non-mapped files, e.g., data and/or files associated with the system sold under the mark ADOBE®, and the like, and/or portions of binaries not currently in use by the process and have been marked invalid, may be acquired.

The full acquisition provided by the system of the present inventive concept resolves issues presented by missing data and/or misattributed data.

Having acquired complete process data including reconstructed mapped binary data, the system utilizes one or more markers for comparison of the process data to determine, for example, whether the data is compromised in step 160. In a preferred embodiment, the system utilizes a hashing process to generate hash values or hashes to function or operate as unique and secure markers. The hashes generated by the system may be based on or generated against specific binaries imported by the process.

Upon generation of the hashes, the system compares the hashes to a set of control values, e.g., hashes of original copies of binaries or other copies known to be in perfect condition, i.e. known to be uncompromised data, and produces a result based on the comparison. For example, the system may parse the ImageSectionObject of a File Object to calculate the same hash from memory as a hash generated from disk file(s) (an "original" binary). If the hash between an original binary and a reconstructed binary correspond to each other match, the result produced by the system indicates that the reconstructed binary has not been compromised. Alternatively, if the hashes do not match, the reconstructed binary contains one or more modifications. In this manner, the system is operable to determine whether data has been compromised with a high degree of confidence. The system, and data generated thereby, may be utilized in a forensic investigations process.

Information and signals may be represented using any of a variety of different technologies and techniques. For example, data, instructions, commands, information, signals, bits, symbols, and/or chips referenced herein may be represented by voltages, currents, electromagnetic waves, magnetic fields or particles, optical fields or particles, and/or any combination thereof.

Various illustrative logical blocks, modules, circuits, and/or algorithm steps described in connection with the embodiments disclosed herein may be implemented as electronic hardware, computer software, and/or combinations of both. To clearly the interchangeability of hardware and software, various illustrative components, blocks, modules, circuits, and steps have been described above generally in terms of their functionality. Whether such functionality is implemented as hardware or software depends upon the particular application and design constraints imposed on the overall system. The functionality of the present inventive concept may be implemented in various ways for each particular application without deviating from the scope of the present inventive concept.

The various illustrative logical blocks, modules, and circuits of the present inventive concept may be implemented or performed with a general purpose processor, a digital signal processor (DSP), an application specific integrated circuit (ASIC), a field programmable gate array (FPGA) or other programmable logic device, discrete gate or transistor logic, discrete hardware components, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, and/or any other such configuration.

The steps of a method or algorithm described in connection with the embodiments of the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Method steps performed by the system of the present inventive concept as described herein may be interchanged without deviating from the scope of the present inventive concept.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A method to determine whether a computer system has been compromised, the method comprising the steps of:
    traversing a virtual address descriptor to acquire process data;
    reconstructing mapped data based on the acquired process data;
    storing the mapped data via a memory of a system, and
    traversing a virtual address control block to recover a file from a memory cache if (i) a page table entry is invalid, and (ii) a valid data length related to the file is not determined to be greater than a size of the file,
    wherein,
        the mapped data is obtained when a virtual address causes a page fault, and
        the page fault triggers the system to execute a process to automatically acquire the mapped data.

2. The method of claim 1, wherein the traversing the virtual address descriptor includes (i) traversing at least one descendant lineage to a terminal node using at least one pointer and at least one node, and (ii) retrieving data associated with the at least one node.

3. The method of claim 2, wherein the pointer is a SECTION_OBJECT_POINTER structure having (i) a first pointer named ImageSectionObject, (ii) a second pointer named DataSectionObject, and (iii) a third pointer named SharedCacheMap.

4. The method of claim 1, further comprising the step of:
    generating, via a processor of the system, at least one marker based on the mapped data.

5. The method of claim 4, wherein the marker is a set of hashes.

6. The method of claim 4, further comprising the step of:
comparing, vit the processor, the at least one marker to another marker to determine whether a compromise exists within the system.

7. The method of claim 6, wherein the another marker is based on binary data of known uncompromised data.

8. The method of claim 7, wherein the another marker is a set of hashes.

9. The method of claim 6, further comprising the step of:
determining whether the mapped data is compromised based on the comparison.

10. The method of claim 1, further comprising the step of:
executing a hashing process to produce a plurality of hash values based on the mapped data;
comparing the plurality of hash values with a set of control values and producing a result; and
determining whether the mapped data is compromised based on the result.

11. A method of reconstructing a process using a computer system, the method comprising the steps of:
traversing a virtual address descriptor to acquire process data;
reconstructing mapped data based on the acquired process data;
storing the mapped data via a memory of the computer system, and
traversing a virtual address control block to recover a file from a memory cache if (i) a page table entry is invalid, and (ii) a valid data length related to the file is not determined to be greater than a size of the file,
wherein,
the mapped data is obtained when a virtual address causes a page fault, and
the page fault triggers the computer system to execute a process to automatically acquire the mapped data.

12. The method of claim 11, wherein the traversing the virtual address descriptor includes (i) traversing at least one descendant lineage to a terminal node using at least one pointer and at least one node, and (ii) retrieving data associated with the at least one node.

13. The method of claim 12, wherein the pointer is a SECTION_OBJECT_POINTER structure having (i) a first pointer named ImageSectionObject, (ii) a second pointer named DataSectionObject, and (iii) a third pointer named SharedCacheMap.

14. The method of claim 11, further comprising the step of:
generating, via a processor, at least one marker based on the mapped data,
wherein,
the marker is a set of hashes.

15. The method of claim 14, further comprising the step of:
comparing, via the processor, the at least one marker to another marker to determine whether a compromise exists,
wherein the another marker is based on binary data of known uncompromised data.

16. The method of claim 15, wherein the another marker is a set of hashes.

17. The method of claim 15, further comprising the step of:
determining whether the mapped data is compromised based on the comparison.

18. The method of claim 11, further comprising the step of:
executing a hashing process to produce a plurality of hash values based on the mapped data;
comparing the plurality of hash values with a set of control values and producing a result; and
determining whether the mapped data is compromised based on the result.

* * * * *